United States Patent [19]
Kratochvil et al.

[11] 3,917,791
[45] Nov. 4, 1975

[54] METHOD FOR THE BELLOWLESS VULCANIZATION OF TIRE BLANKS

[75] Inventors: Egon Kratochvil, Maria Enzersdorf; Günther Pech, Vienna, both of Austria

[73] Assignee: Semperit AG, Vienna, Austria

[22] Filed: Feb. 5, 1973

[21] Appl. No.: 329,848

[30] Foreign Application Priority Data
Feb. 8, 1972  Austria ................................ 993/72
Feb. 8, 1972  Austria ................................ 994/72

[52] U.S. Cl. ............... 264/326; 264/94; 425/32; 425/36; 425/44; 425/58
[51] Int. Cl.² .......................................... B29H 5/02
[58] Field of Search ......... 264/36, 315, 326, 89, 94; 425/24, 36, 48, 54–58, 32, 44

[56] References Cited
UNITED STATES PATENTS
| | | | |
|---|---|---|---|
| 2,812,544 | 11/1957 | Soderquist | 425/36 X |
| 2,880,458 | 4/1959 | Frohlich et al. | 264/315 |
| 2,959,815 | 11/1960 | Brundage | 425/36 X |
| 3,690,794 | 9/1972 | Shellabarger | 425/24 X |

*Primary Examiner*—Jan H. Silbaugh
*Attorney, Agent, or Firm*—Werner W. Kleeman

[57] ABSTRACT

A method of the bellowless vulcanization of tire blanks, wherein the tire beads are pressed by a press or contact mechanism against the base region of the mold halves. The press mechanism, at least for a period of time, is removed from the tire beads before or during vulcanization.

6 Claims, 10 Drawing Figures

METHOD FOR THE BELLOWLESS VULCANIZATION OF TIRE BLANKS

BACKGROUND OF THE INVENTION

The present invention relates to a new and improved method of the bellowless vulcanization of tire blanks, wherein the tire beads are pressed by a press mechanism against the foot or base region of the mold halves.

The use of an expandable and heatable bellows constitutes part of the state-of-the-art vulcanization devices which are generally employed in processes for vulcanization of tire blanks. The bellows serves to dish or arch the tire blank and to press the latter against the vulcanization mold.

The drawback of such technique resides, on the one hand, in the apparatus construction required for this purpose, and furthermore in the presence of the bellows itself which is subject to malfunction, and therefore at certain time intervals must be exchanged. The necessary expenditure required for replacing the bellows and the therewith associated downtime of the vulcanization mold increases the costs for the production of the tires and maintenance of the equipment.

Furthermore, possible irregularities of the bellows are transferred to the finished vulcanized tire and this becomes perceptible during production. For instance, during the dishing operation weaker locations of the bellows tend to become markedly expanded, resulting in a pronounced elongation of the tire blank at the corresponding location. It is further to be mentioned that the bellows must be provided at its outer surface with a multiplicity of grooves in order to be able to withdraw the air between the tire blank and the bellows. During the vulcanization operation, these grooves are formed as ribs at the inside of the tire, with the result that deformations can occur at the inner carcass layers.

In order to counteract the aforementioned drawbacks, attempts have been made to conduct the vulcanization medium directly against the inner wall of the tire while dispensing with the use of the bellows. With this procedure, the tire beads of the tire blank are pressed by a press or pressure mechanism in the axial direction against the bead sections of the mold.

What is important in this regard is to attain a perfect seal at the region of a tire bead, since penetration of vulcanization medium between the outer wall of the tire and the mold causes reject of the tire.

The previously known techniques for the bellowless vulcanization possess the drawback that a certain region at the tire bead remains covered with respect to the vulcanization medium during the vulcanization process, which of course leads to a surge or jump in the temperature of the tire material at the corresponding location. However, the quality of the tire is dependent upon a uniform vulcanization of the entire tire.

With the previously known vulcanization apparatuses for carrying out a process of this type, the tire blank is pressed at the region of the tire bead against the bead section of the vulcanization mold by means of essentially disk-shaped press plates.

The shortcomings which arise with such type press plates are the following: firstly, it is difficult to configure such in a manner that it is possible to automatically charge or load the vulcanization apparatus; additionally the tire blank becomes completely covered during the vulcanization process, so that temperature surges arise at the tire which considerably impair its quality.

There is further known to the art a vulcanization apparatus for carrying out a process of this type which possesses six rotatable rollers accommodated to the shape of the tire bead, the axes of rotation of which extend parallel to the tire radius. Consequently, there is present the drawback that owing to the few rollers which move at the periphery of the tire bead, the air cannot be completely pressed out of the vulcanization mold, and simultaneously during the roller movement there is present a brief raising or lift-off of the bead since the rollers tend to drive the raw rubber ahead of such in the manner of a wave, so that again air inclusions are formed which considerably impair the quality of the final product.

SUMMARY OF THE INVENTION

Hence, with the foregoing in mind, it should be apparent that this particular field of technology is still in need of methods of, and apparatuses for, the bellowless vulcanization of tire blanks which are not associated with the aforementioned drawbacks and limitations of the prior art proposals. It is therefore a primary object of the present invention to provide a new and improved method of the bellowless vulcanization of tire blanks in a manner which effectively and reliably fulfills the existing need in the art and is not associated with the aforementioned drawbacks and limitations of the prior art proposals.

It is another significant object of the present invention to provide a new and improved method of the bellowless vulcanization of tire blanks which, while preventing the aforementioned drawbacks, renders possible a sealing retention of the tire bead, wherein however temperature losses are extensively compensated.

Now in order to implement these and still further objects of the invention, which will become more readily apparent as the description proceeds, the invention contemplates that the contact or press mechanism, before or during the vulcanization operation, is at least briefly removed from the tire beads. This can occur in particular at that time when the internal pressure of the heating medium has sufficiently pressed the tire blank against the mold.

When practicing the method of this invention, there is attained the necessary sealing action between the tire bead and the corresponding mold section, without there occurring any disadvantageous thermal loss owing to continuously covering the tire bead.

According to one manifestation of the invention, there is used as the press or contact mechanism a clamping device which for each vulcanization operation is pressed-on one time and after realizing the seal between the tire bead and the mold part is raised.

A second advantageous aspect of this invention contemplates a multiple or repeated pressing and raising of the clamping mechanism per vulcanization operation, whereafter again after there has been realized sealing of the bead with the mold, the clamping mechanism is finally raised from the tire bead.

With both of the aforementioned method possibilities it is advantageous if the clamping mechanism bears as briefly as possible against the tire bead.

A repeated rapid and successive pressing and raising of the clamping mechanism at the start of the vulcanization operation, whereupon, after the tire bead sealingly bears against the mold part, the clamping mechanism is completely raised from the tire bead, is a procedure which can be particularly advantageously employed when vulcanizing diagonal tires, since in this regard, in contrast to the vulcanization of a radial tire, there occurs a considerably greater bead rotation. Due to the repeated raising of the clamping mechanism, and in contrast to the previously employed techniques, this bead rotation is facilitated and not prevented.

A different method possibility for attaining the production of tires of good quality while essentially completely preventing rejects during the bellowless vulcanization of tire blanks resides in the features that there are provided rollers distributed about the bead periphery and serving as the press or contact mechanism, and these rollers are moved one or a number of times radially at the inside of the tire in the direction of the sidewall. In contrast to the known roller contact device having rollers which roll upon the bead in the peripheral direction, in this case there does not occur any displacement tendency at the bead in the peripheral direction, and there exists the possibility of expanding the advantages of the roll-on operation up to the region of the sidewall.

As already indicated above, the invention is not only concerned with the aforementioned method aspects, but also relates to a new and improved construction of apparatus for the performance of the aforesaid inventive method and which comprises a press or contact mechanism, preferably containing press or contact rollers which are pivotable by means of a rod or linkage arrangement, the axes of rotation of which rollers in each case extend perpendicular to the tire radius and which in the contact or press-on position delimit or bound a circle, the diameter of which approximately corresponds to that of the tire bead and which is located concentrically with respect thereto.

The apparatus of this development also solves the problems which occur during automatic charging, since the rollers arranged upon a centrally aligned rod arrangement in a condition where they are removed or raised from the tire bead delimit a circle of lesser diameter than in the press-on or contact position.

In order to facilitate positioning of the press rollers, a preferred embodiment of the invention contemplates arranging pressure or compression springs between rod components of the rod arrangement or the press rollers and which bear at both ends against neighboring rod components and/or neighboring press rollers.

The pressure springs thus function in one embodiment of the invention in such a manner that they bear against the end surfaces of the press rollers and are mounted upon axial pins of the press rollers.

A deformation of the tire bead during the pressing operation is prevented by intermediate rollers mounted upon bearing pins of the rod components and/or the press rollers, wherein the bearing pins are displaceable at the intermediate rollers and the intermediate rollers together with the press rollers in the contact or press-on position commonly delimit a circle.

A particularly good pressing-out or expulsion of the residual air located between the tire blank and the vulcanization mold can be attained in that the outer jacket or surface of the rollers is designed as an expansible sleeve or covering arranged at a radial spacing from the roller core. If the rollers are moved along the bead inner surface essentially in radial direction with respect to the tire bead, then the previously explained action can be even further considerably improved.

If the rod arrangement with the rollers is rotatable in the peripheral direction of the tire bead, there is additionally realized an effective press-on or contact action at each point at the inside of the tire.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
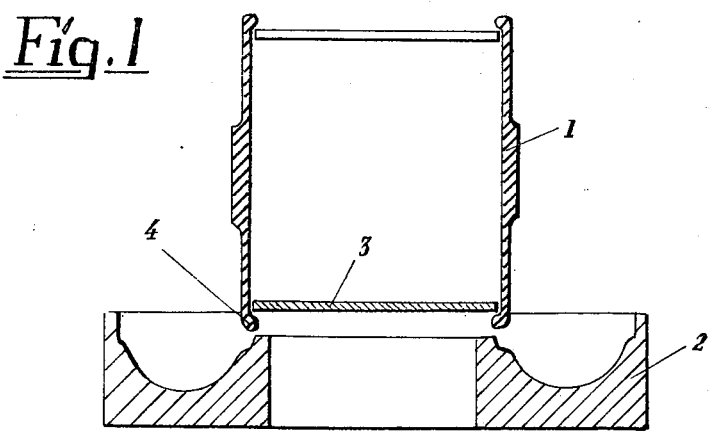
FIG. 1 schematically illustrates a vulcanization mold with a clamping mechanism with the components depicted in a position which they assume during a first step of the method.
Figure 2:
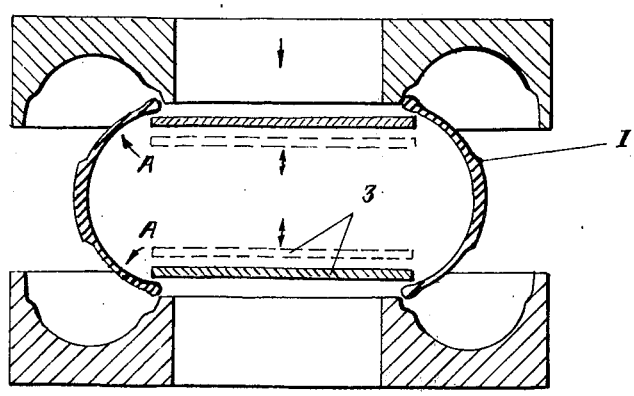
FIGS. 2 and 3 illustrate the vulcanization mold and the clamping mechanism during further method steps.
Figure 3:
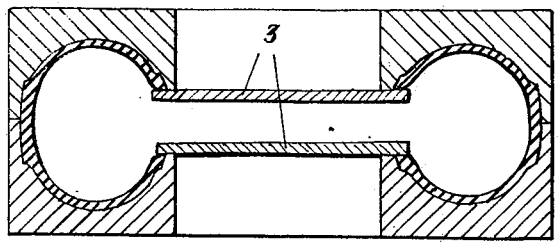

Considering now the drawings, and as will be apparent by referring to FIGS. 1–3, the tire blank 1 is placed upon the lower mold half 2 and is retained at the bead region against the bead sections 4 by means of the clamping mechanism 3.

During the tire dishing operation, the clamping mechanism 3 is raised and contacted or pressed-on a number of times, so that the tire bead has the possiblity of rotating through about 90° in the direction of the arrow A. The frequency of this raising and press-on action can be increased up to a point constituting a condition of vibration.

After this rotation has terminated and the tire bead sealingly bears against the mold section, the clamping mechanism is finally raised, in order to thus provide for uniform vulcanization of the entire tire.

The further vulcanization operation can then proceed analogous to one of the known techniques for bellowless vulcanization of tires.

In the exemplary embodiment of FIGS. 1–3, reference has only been made to the lower mold half, wherein of course it should be apparent that the method is practiced in the same manner at both mold halves.

Figure 4:
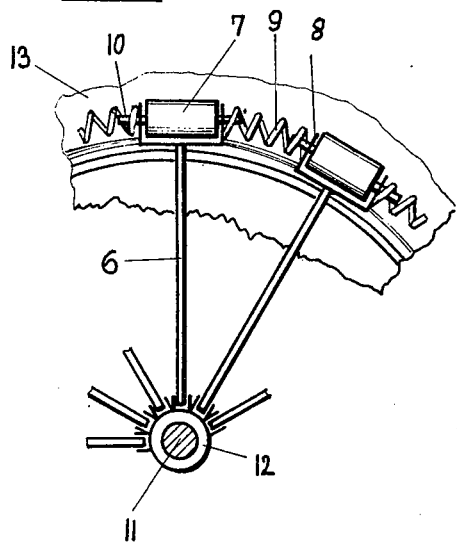
FIGS. 4, 5, 6 and 7 respectively schematically show sectional views in the plane of the equator of the tire through different exemplary embodiments of vulcanization apparatuses designed according to the teachings of the present invention.

With the exemplary embodiment of vulcanization apparatus designed according to the teachings of the invention as depicted in FIG. 4, the press or contact rollers 7 are mounted in forks 8 at the outer end of rod components, that is to say, support rods 6 of a rod arrangement. The support rods 6 are displaceably guided by means of a support sleeve 12 upon a column or shaft 11 arranged at the center of the vulcanization mold 13 perpendicular to the central plane of the tire. Between neighboring rollers 7 and forks 8 there is arranged in each case a pressure or compression spring 9 which is mounted upon bearing pins 10 protruding from the forks 8. The bearing pins 10 are axially aligned with the press rollers 7, and the compression springs 9 are slightly bowed or flexed in the peripheral direction.

Figure 5:
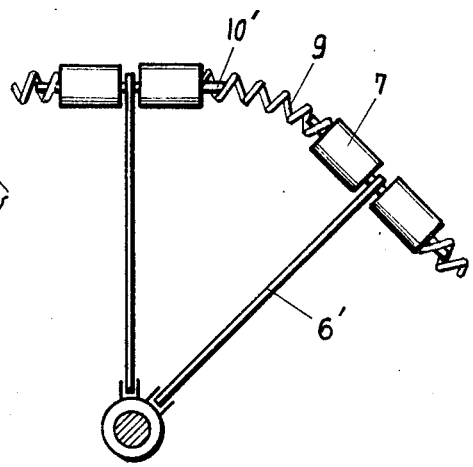

In the exemplary embodiment of the invention as depicted in FIG. 5, the press or contact rollers 7 are rotatably arranged to the right and left of a single-arm rod component or part 6' of a rod arrangement. Here the pressure springs 9 are mounted upon bearing pins 10' which protrude from such press rolls 7 and act directly upon the end faces of such press rolls 7.

Figure 6:
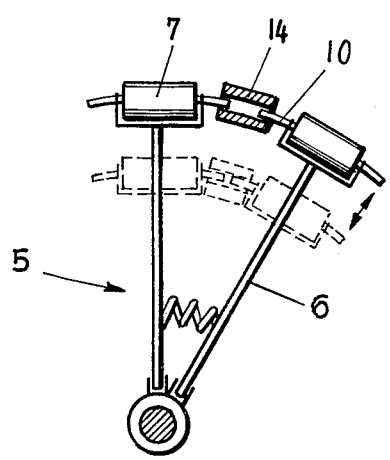
Figure 7:
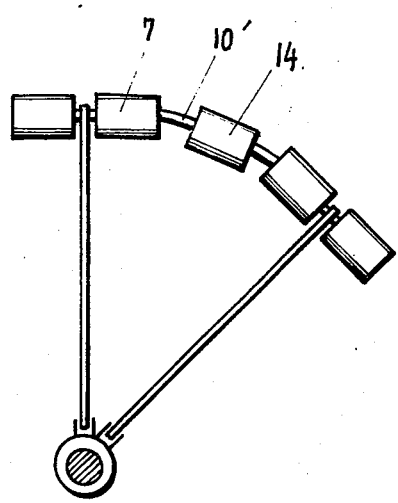

Now according to variant exemplary embodiments of the invention, as depicted in greater detail in FIGS. 6 and 7, it is contemplated to arrange at the region between the press rolls 7 intermediate rollers or rolls 14 instead of the pressure springs 9.

The expression "intermediate rollers or rolls" is to be understood in the context of this disclosure that these rolls or rollers 14 are not fixedly mounted, rather at the relevant bearing pins 10, 10' can penetrate therein to a greater or lesser extent so as to compensate the difference in spacing between the rollers 7 and 14 which occurs during the contact and raising of the clamping mechanism.

Since these intermediate rolls or rollers 14 cannot assume the function of the pressure or compression springs 9, it is advantageous to arrange such, in the manner depicted in FIG. 6, at a different location of the rods, as generally indicated by reference character 5.

Under certain circumstances, it would also be possible to effectively arrange as a combined exemplary embodiment the pressure springs 9 between the press rollers 7 and the intermediate rollers 14.

FIG. 6 further shows in phantom lines and in exaggerated manner the position of the rollers 7 and 14 when the rod arrangement is removed or withdrawn.

Figure 8:
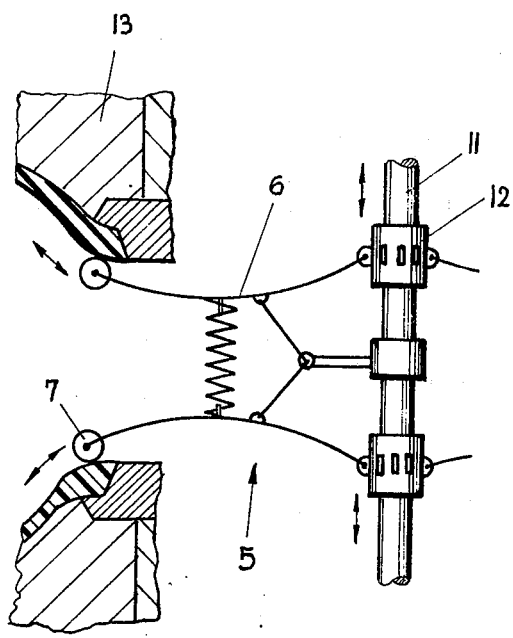
FIG. 8 schematically illustrates a sectional view, perpendicular to the central plane of the tire, through a further embodiment of vulcanization apparatus.
Figure 9:
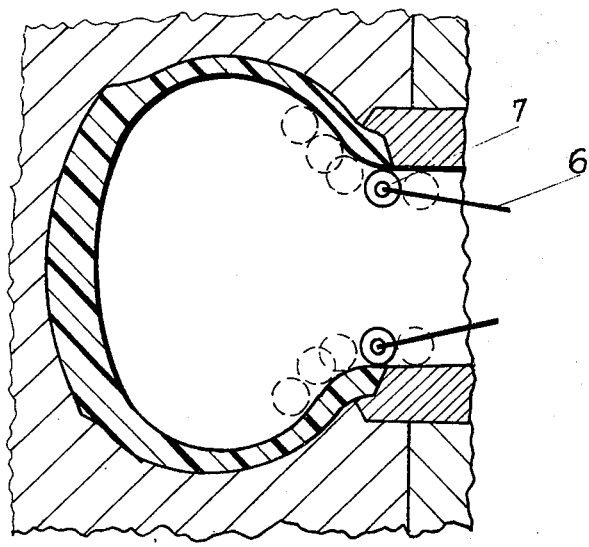
FIG. 9 illustrates a similar fragmentary sectional view.

Now as best seen by referring to the embodiment of FIG. 8, the support rods 6 are resilient and designed to be flexed with respect to the plane of the mold. Now if the support sleeves 12, also after contact of the press rolls 7 and possibly the intermediate rolls 14 against the tire bead, are further guided with respect to the central plane of the tire, then the rollers or rolls 7 and 14 deviate or shift in the radial direction. As a result, it is possible due to a to-and-fro movement of the support sleeves 12, to realize a uniform contact of a larger tire section, without such tire section remaining appreciably covered with respect to the vulcanization medium. This procedure has been schematically depicted in FIG. 9.

Figure 10:
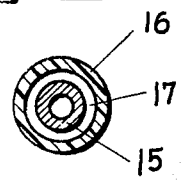
FIG. 10 illustrates a cross-section view through an exemplary embodiment of roller or roll constructed according to the invention.

FIG. 10 illustrates an exemplary embodiment of construction of the rollers 7 or 14, wherein a bellows 17 is formed by the roller core 15 and the roller jacket 16 and which is preferably filled with air or another suitable medium. Preferably all of the press— and intermediate rollers 7 and 14 are constructed so as to possess a suitable adhesion reducing jacket surface.

With the inventive apparatus, the tire blank, with the clamping mechanism raised in known manner, can be placed upon the lower half of the vulcanization mold, whereupon before or during the initiation of the vulcanization operation, the support sleeves can be moved towards one another. As a result, the rods 6 are rocked into the contact planes, and press the tire bead sealingly against the corresponding mold section or portion. Due to a to-and-fro movement of the support sleeves, it is now possible, as already explained, to move across a larger section of the tire and accordingly to uniformly expose each location of the tire to the vulcanization medium.

In order to realize a complete uniform contact or press-on operation, it is advantageous if the rods, possibly by rotation of the column 7, are shiftable in peripheral direction of the tire bead.

While there is shown and described present preferred embodiments of the invention, it is to be distinctly understood that the invention is not limited thereto, but may be otherwise variously embodied and practiced within the scope of the following claims. Accordingly,

What is claimed is:
1. In a method of bellowless vulcanization of tire blanks having tire beads comprising the steps of:
   a. providing a tire mold including a pair of heated mold halves,
   b. inserting a tire blank in the mold and sealing the beads therein by means of a press mechanism,
   c. dishing the tire blank by bringing the heated mold halves together,
   d. rotating the tire beads during said dishing step, and
   e. performing a vulcanization operation;
      the improvement comprising releasing the press mechanism at least for a period of time prior to initiation of said vulcanization operation to permit rotation of the tire beads during dishing of the tire blank.
2. The method as defined in claim 1, further including the step of employing as the press mechanism a clamping mechanism, and pressing-on and raising the clamping mechanism once during said vulcanization operation.
3. The method as defined in claim 1, further including the steps of employing as the press mechanism a clamping mechanism, and pressing-on and raising the clamping mechanism a number of times during said vulcanization operation.
4. A method for the bellowless vulcanization of tire blanks having tire beads in a mold including two halves each of which has a base region, comprising inserting a tire blank in the mold and pressing the beads against the base region of the mold halves by means of a clamping mechanism, dishing the tire blank in the mold while rotating the tire beads, initiating a vulcanization operation, carrying out a repeated rapid successive pressing-on and raising of the clamping mechanism at the beginning of said vulcanization operation to facilitate curing of said beads and rotation of said beads during said dishing step, continuing said vulcanization operation until said tire beads sealingly bear against the mold, and thereafter raising the clamping mechanism completely from the tire beads and completing said vulcanization operation.
5. A method for the bellowless vulcanization of tire blanks having tire beads and sidewalls in a mold including two mold halves each of which has a base region, comprising inserting a tire blank in the mold and pressing the beads against the base region of the mold halves by means of a clamping mechanism including a plurality of rollers distributed about the periphery of the tire beads for providing a sealing arrangement thereabout, initiating a vulcanization operation, dishing the tire blank in the mold, rotating the tire beads during said dishing step, and moving the rollers at least once radially at the inside of the tire blank in the direction of the sidewalls prior to completion of said vulcanization operation to facilitate bead rotation and curing.
6. The method as defined in claim 5, further including the step of moving the rollers a number of times radially at the inside of the tire in the direction of the sidewall.

* * * * *